United States Patent [19]

Hisamoto et al.

[11] Patent Number: 4,681,974

[45] Date of Patent: Jul. 21, 1987

[54] FLUORINE-CONTAINING POLYMER

[75] Inventors: Iwao Hisamoto; Masayuki Yamana, both of Osaka, Japan

[73] Assignee: Daikin Industries Ltd., Osaka, Japan

[21] Appl. No.: 726,323

[22] Filed: Apr. 23, 1985

[30] Foreign Application Priority Data

Apr. 28, 1984 [JP] Japan ................................ 59-87100

[51] Int. Cl.$^4$ ................... C07C 69/773; C07C 69/80; C07C 69/67; C07C 93/04
[52] U.S. Cl. ..................................... 560/87; 560/182; 560/196; 564/505
[58] Field of Search ..................... 560/87, 182, 196; 564/505

[56] References Cited

U.S. PATENT DOCUMENTS 4,094,796  6/1978  Schwarz ........................ 560/196 X Primary Examiner—Natalie Trousof
Assistant Examiner—Vera C. Clarke
Attorney, Agent, or Firm—Birch, Stewart, Kolasch & Birch

[57] ABSTRACT

A fluorine-containing polymer comprising units of the formula:

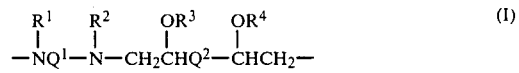

wherein $R^1$ and $R^2$ are, the same or different, a fluorine-containing organic group, $R^3$ and $R^4$ are, the same and different, hydrogen or a lower acyl group, and $Q^1$ and $Q^2$ are, the same or different, a divalent organic group with at least one oxy group, which polymer having a number average molecular weight of 5,000 to 100,000, which is easily dissolved in oils and lowers surface tension thereof.

8 Claims, No Drawings

FLUORINE-CONTAINING POLYMER

BACKGROUND OF THE INVENTION

The present invention relates to a fluorine-containing polymer. More particularly, the present invention relates to a fluorine-containing polymer derived from a fluorine-containing diamine and a diepoxide.

SUMMARY OF THE INVENTION

One object of the present invention is to provide a novel fluorine-containing polymer comprising units derived from a fluorine-containing diamine and a diepoxide.

Another object of the present invention is to provide a novel fluorine-containing polymer which is easily soluble in oils and lowers the surface tension thereof.

A further object of the present invention is to provide a novel fluorine-containing polymer which is useful as an additive, a leveling agent, an emulsifier, etc.

DETAILED DESCRIPTION OF THE INVENTION

The present invention provides a fluorine-containing polymer comprising units of the formula:

$$-NQ^1-N-CH_2CHQ^2-CHCH_2- \quad (I)$$
$$\phantom{-NQ^1-N-CH_2CHQ^2-}\,\,\,\overset{|}{R^1}\,\,\,\overset{|}{R^2}\,\,\,\,\overset{|}{OR^3}\,\,\,\,\overset{|}{OR^4}$$

wherein $R^1$ and $R^2$ are, the same or different, a fluorine-containing organic group, $R^3$ and $R^4$ are, the same and different, hydrogen or a lower acyl group, and $Q^1$ and $Q^2$ are, the same or different, a divalent organic group with at least one oxy group. The polymer has a number average molecular weight of 5,000 to 100,000.

In the formula (I), $R^1$ and $R^2$ are each a fluorine-containing organic group, preferably a group of the formula:

$$R_f(CH_2)_nY_k- \quad (II)$$

wherein $R_f$ is a $C_3$–$C_{21}$ fluorine-containing aliphatic group which may contain at least one oxy group, Y is a group of the formula:

$$-\overset{|}{\underset{OR^3}{C}}HCH_2- \quad (III)$$

wherein $R^3$ is the same as described above, n is an integer of 0 to 8 and k is 0 or 1.

The lower acyl group of $R^3$ and $R^4$ is one having one to four carbon atoms.

$Q^1$ and $Q^2$ are each a divalent organic group with at least one oxy group, and preferably a $C_3$–$C_{120}$ oxyalkylene group optionally having a hydroxyl group, or a group of the formula:

$$-(CH_2)_m-O\overset{O}{\overset{\|}{C}}R^5\overset{O}{\overset{\|}{C}}O-(CH_2)_m- \quad (IV)$$

wherein $R^5$ is a $C_3$–$C_{120}$ alkylene group optionally having an oxy group or a $C_6$–$C_{15}$ aromatic group, and m is an integer of 1 to 8.

The fluorine-containing polymer of the present invention may be prepared by polymerizing a diamine of the formula:

$$\underset{NHQ^2-NH}{\overset{R^1\phantom{xxx}R^2}{|\phantom{xxxx}|}} \quad (V)$$

wherein $R^1$, $R^2$ and $Q^1$ are the same as defined above and a diepoxide of the formula:

$$\overset{O}{\underset{CH_2-CHQ^2-CH-CH_2}{\diagup\,\,\,\diagdown\phantom{xxxx}\diagup\,\,\,\diagdown}} \quad (VI)$$

wherein $Q^2$ is the same as defined above in an organic solvent.

Specific examples of the organic solvent are alcohols (e.g. methanol, ethanol, isopropanol, butanol, etc.), ethers (e.g. diethyl ether, tetrahydrofuran, monglyme, diglyme, etc.), hydrocarbons (e.g. hexane, heptane, etc.) and aromatic compounds (e.g. benzene, toluene, etc.).

The reaction temperature is preferably from 20° to 150° C., and more preferably from 60° to 100° C. The reaction time is preferably from 3 to 10 hours, more preferably from 5 to 8 hours.

The reaction of the diamine compound (V) and the diepoxide (VI) proceeds with the ring opening of the epoxy groups of the diepoxide (VI) and forming hydroxyl groups. The thus formed hydroxyl groups may be acylated so as to improve solubility of the polymer in oils. The acylation may be carried out by a per se conventional method, for example, with a corresponding acid halide or anhydride.

Specific examples of the diamine (V) are as follows:

$$\underset{C_8F_{17}CH_2\overset{|}{C}HCH_2NH(CH_2)_3OCH_2CH_2O(CH_2)_3NHCH_2\overset{|}{C}HCH_2C_8F_{17}}{\overset{OH\phantom{xxxxxxxxxxxxxxxxxxxxxxxxxxxxxxxxx}OH}{|\phantom{xxxxxxxxxxxxxxxxxxxxxxxxxxxxxxxxxxx}|}}$$

$$\underset{C_9F_{19}(CH_2)_4\overset{|}{C}HCH_2NH(CH_2)_3O(CH_2CH_2O)_7(CH_2)_3NHCH_2\overset{|}{C}H(CH_2)_4C_9F_{19}}{\overset{OCOCH_3\phantom{xxxxxxxxxxxxxxxxxxxxxxxxxxxx}OCOCH_3}{|\phantom{xxxxxxxxxxxxxxxxxxxxxxxxxxxxxxxxx}|}}$$

$$\underset{C_5F_{11}\overset{|}{C}HCH_2NH(CH_2)_3O(CH_2CH_2O)_{30}(CH_2)_3NHCH_2\overset{|}{C}HC_5F_{11}}{\overset{OH\phantom{xxxxxxxxxxxxxxxxxxxxxxxxxxxxxx}OH}{|\phantom{xxxxxxxxxxxxxxxxxxxxxxxxxxxxxxxx}|}}$$

$$\underset{C_9F_{19}CH_2CH_2NH\overset{|}{C}HCH_2O\overset{|}{C}HCH_2NHCH_2CH_2C_9F_{19}}{\overset{CH_3\phantom{xxxxxxxxxxxx}CH_3}{|\phantom{xxxxxxxxxxxxxx}|}}$$

$$\underset{C_7F_{15}CH_2\overset{|}{C}HCH_2NH\overset{|}{C}HCH_2O(\overset{|}{C}HCH_2O)_{25}NHCH_2\overset{|}{C}HCH_2C_7F_{15}}{\overset{OH\phantom{xxx}CH_3\phantom{xxxx}CH_3\phantom{xxxxxxxxx}OH}{|\phantom{xxxxx}|\phantom{xxxxxx}|\phantom{xxxxxxxxxxx}|}}$$

-continued

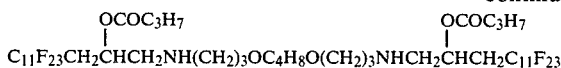

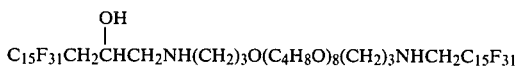

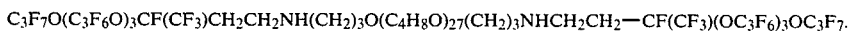

Specific examples of the diepoxide (VI) are as follows:

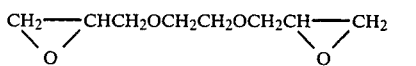

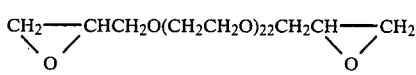

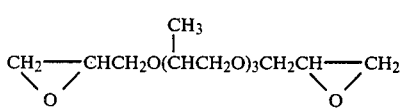

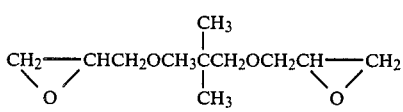

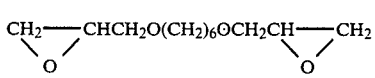

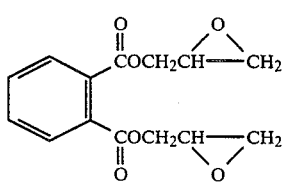

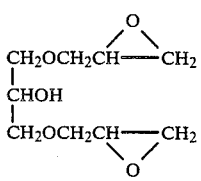

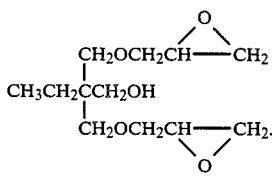

The fluorine-containing polymer of the present invention has some characteristics which are not found in similar conventional polymers. For example, the polymer is well dissolved in oils and lowers the surface tension of the oils. A lubricant has better lubricity as it more easily forms a thin homogeneous film when it is applied on a sliding surface of, for example, metal. For the formation of such a film, the lubricant should have smaller surface tension. When the polymer of the invention is added to the lubricant even in a small amount, it effectively lowers the surface tension.

In addition to the above application as an additive for the oils, the fluorine-containing polymer of the present invention is preferably used as an additive for a fire-extinguisher, a leveling agent for various waxes and coatings, a penetrating agent for fibers, metals or photograph processing agent, a surface-modifying agent for resins, a mold release agent, and an emulsifier for emulsion polymerization.

The present invention will be hereinafter explained further in detail by following Examples.

EXAMPLE 1

To a four-necked 100 ml flask, added were $C_9F_{19}CH_2CH(OH)CH_2NH(CH_2)_3O[(CH_2)_4O]_8(CH_2)_3NHCH_2CH(OH)CH_2C_9F_{19}$ (17.6 g, 0.01 mole,

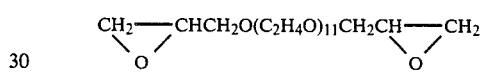

(6.14 g, 0.01 mole) and isopropanol (20 g) and reacted at 80° C. for 6 hours with stirring. Thereafter, isopropanol was distilled from the reaction mixture under reduced pressure. The residue was washed with benzene and dried under reduced pressure to obtain a viscous liquid (21.5 g).

A number average molecular weight ($M_n$) and its degree of distribution ($M_w/M_n$) of the thus prepared liquid were measured by means of a gel permeation chromatography (manufactured by Waters) under following conditions to be $1.3 \times 10^4$ and 1.4, respectively.

Conditions

Column: connected columns of Shodex (trade name) A-803, A-805 and A-806
Standard: polystyrene
Solvent: dimethylformamide
Temperature: 40° C.
Flow rate: 1.0 ml/min.
Sample concentration: 0.1% by weight.

In IR spectrum, absorption at 1,250 cm$^{-1}$ corresponding to symmetric stretching vibration of the epoxy rings and that at 3,330 cm$^{-1}$ corresponding to stretching vibration of the nitrogen-hydrogen bonds in the secondary amine disappeared. In $^1$H-NMR, a signal at $\delta=4.65$ ppm for hydrogen atoms of the secondary amine disappeared and that at $\delta=4.83$ ppm for hydrogen atoms of the hydroxyl groups appeared.

| Elemental analysis: | C | H | N | F |
|---|---|---|---|---|
| Calc'd (%): | 45.49 | 6.07 | 1.18 | 30.41 |
| Found (%): | 45.61 | 6.05 | 1.10 | 30.21 |

According to the above results, the product was identified as a compound having repeating units of the formula:

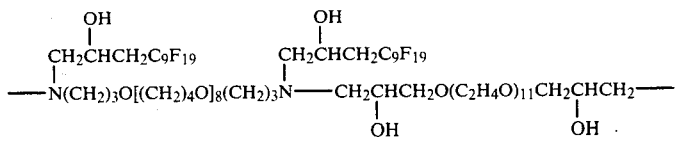

EXAMPLE 2

In the same manner as in Example 1 but using, as starting materials, $C_8F_{17}CH_2CH_2NH(CH_2)_3O(CH_2CH_2O)_2(CH_2)_3NHCH_2CH_2C_8F_{17}$ (13.68 g, 0.01 mole) and

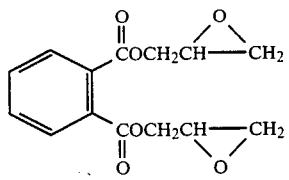

(2.78 g, 0.01 mole), the reaction was carried out to obtain a viscous liquid (14.70 g). $M_n = 1.3 \times 10^4$. $M_w/M_n = 1.5$.

The results of IR and NMR analyses were substantially the same as those in Example 1.

| Elemental analysis: | C | H | N | F |
|---|---|---|---|---|
| Calc'd (%): | 37.99 | 3.17 | 2.01 | 46.47 |
| Found (%): | 37.68 | 3.05 | 2.22 | 46.40 |

The product was identified as a compound having repeating units of the formula:

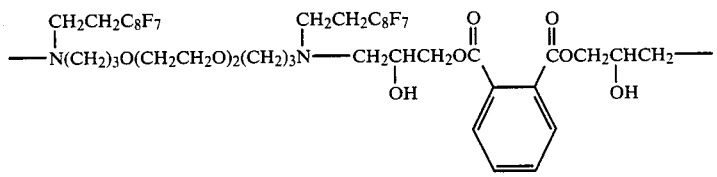

EXAMPLE 3

In the same manner as in Example 1 but using, as starting materials, $C_9F_{19}CH_2CH(OH)CH_2NHCH_2CH(CH_3)$-$H_2O[CH(CH_3)CH_2O]_2CH(CH_3)CH_2NHCH_2CH(OH)CH_2C_9F_{19}$ (13.0 g, 0.01 mole) and

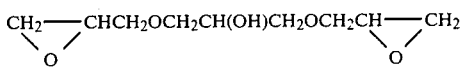

(2.04 g, 0.01 mole), the reaction was carried out to obtain a highly viscous liquid (13.79 g). $M_n = 1.1 \times 10^4$. $M_w/M_n = 1.3$.

The results of IR and NMR analyses were substantially the same as those in Example 1.

| Elemental analysis: | C | H | N | F |
|---|---|---|---|---|
| Calc'd: | 35.90 | 3.59 | 1.86 | 48.01 |
| Found: | 36.08 | 3.71 | 1.81 | 47.77 |

The product was identified to be a compound having repeating units of the formula:

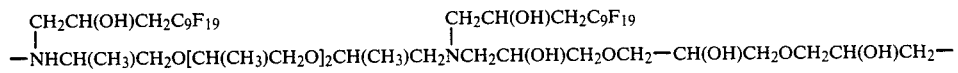

EXAMPLES 4 TO 8 AND COMPARATIVE EXAMPLES 1 TO 3

The surface tension of a 4% by weight solution of the following polymer of a low molecular weight compound in a lubricant (Susony 4GS manufactured by Sunoil Co., Ltd.) was measured by Wilhelmy's method at 25° C.

EXAMPLE 4

Copolymer of

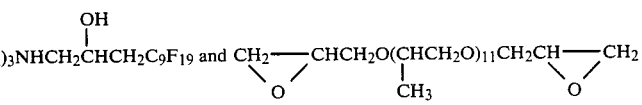

$M_n = 1.4 \times 10^4$.

EXAMPLE 5

Copolymer of

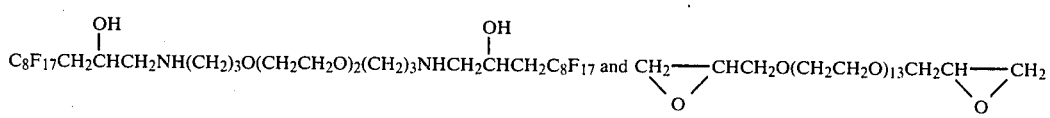

$M_n = 1.3 \times 10^4$.

EXAMPLE 6

Copolymer of

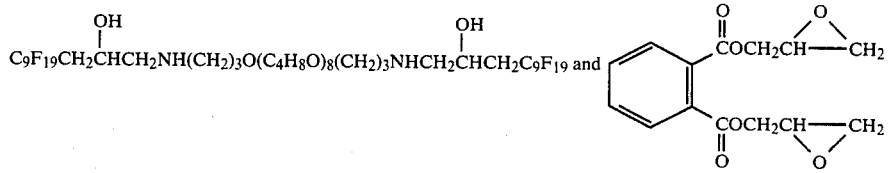

$M_n = 1.8 \times 10^4$.

EXAMPLE 7

Copolymer of

C$_{15}$F$_{31}$CH$_2$CH$_2$NHCHCH$_2$O(CHCH$_2$O)$_{13}$CHCH$_2$NHCH$_2$CH$_2$C$_{15}$F$_{31}$ and (with CH$_3$ substituents) and glycerol diglycidyl ether type epoxide $M_n = 1.1 \times 10^4$.

EXAMPLE 8

Copolymer of

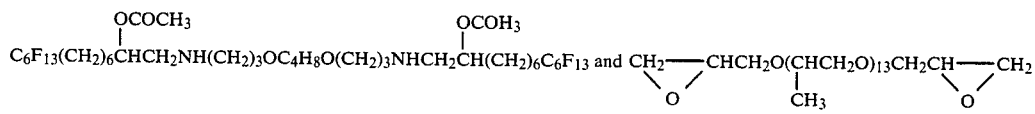

$M_n = 1.8 \times 10^4$.

COMPARATIVE EXAMPLE 1

Copolymer of

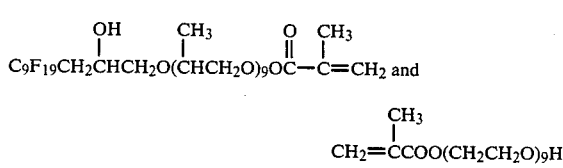

molar ratio of 1:2. $M_n = 2.0 \times 10^4$. $M_w/M_n = 3.0$.

COMPARATIVE EXAMPLE 2

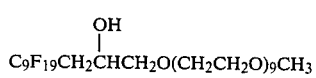

COMPARATIVE EXAMPLE 3

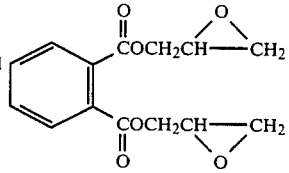

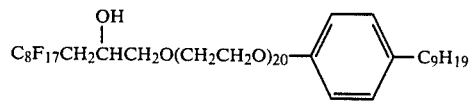

Resultant surface tension is shown in the Table.

TABLE

| | Surface tension (dyn/cm) |
|---|---|
| Example 4 | 12.0 |
| Example 5 | 11.8 |
| Example 5 | 10.7 |
| Example 7 | 12.2 |
| Example 8 | 11.1 |
| Comparative Example 1 | 18.0 |
| Comparative Example 2 | 29.8 |
| Comparative Example 3 | 23.0 |
| (No additive) | 31.1 |

EXAMPLE 9 AND COMPARATIVE EXAMPLE 4

To a composition of Susony 4GS (80% by weight) and a polymer of chlorotrifluoroethylene with a number average molecular weight of 900 (20% by weight), 0.1% by weight of the polymer used in Example 4 (Example 9) or Comparative Example 1 (Comparative Example 4) was added. The threshold load of the mixture was measured by means of a Falex tester (V block: AISI-1137 free machining steel., Pin: SAE-3135 Ni-Cr steel, Surface roughness, maximum 10 micrometers (rms), Rotational speed: 290 rpm, Running speed: 9.8 cm/sec., Loading way: ratchet 360 kg/min. (initial one minute), 135 kg/min. (subsequent one minute), Sample volume: 80 ml). Threshold load in Example 9 was 820 kg while that in Comparative Example 4 was 590 kg.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluorine-containing polymer comprising units of the formula:

$$-NQ^1-N-CH_2CHQ^2-CHCH_2- \quad (I)$$
$$\phantom{-NQ^1-N-}{\overset{|}{R^1}}\phantom{-}{\overset{|}{R^2}}\phantom{-CH_2}{\overset{|}{OR^3}}\phantom{-}{\overset{|}{OR^4}}$$

wherein $R^1$ and $R^2$ are, the same or different, a group of the formula:

$$R_f(CH_2)_nY_k- \quad (II)$$

wherein $R_f$ is a $C_3$–$C_{21}$ fluorine-containing aliphatic group which may contain at least one oxy group, Y is a group of the formula:

$$-CHCH_2- \quad (III)$$
$$\phantom{-}{\overset{|}{OA}}$$

wherein A is hydrogen or a lower acyl group, n is an integer of 0 to 8, k is 0 or 1; $R^3$ and $R^4$ are, the same or different, hydrogen or a lower acyl group, and $Q^1$ and $Q^2$ are, the same or different, a $C_3$–$C_{120}$ oxyalkylene group optionally having a hydroxyl group, or a group of the formula:

$$-(CH_2)_m-O\overset{O}{\overset{\|}{C}}R^5\overset{O}{\overset{\|}{C}}O-(CH_2)_m- \quad (IV)$$

wherein $R^5$ is a $C_3$–$C_{120}$ alkylene group optionally having an oxy group or a $C_6$–$C_{15}$ aromatic group and m is an integer of 1 to 8; said polymer having a number average molecular weight of 5000 to 100,000.

2. A fluorine-containing polymer according to claim 1, wherein the lower acyl group of $R^3$ and $R^4$ is one having 1 to 4 carbon atoms.

3. A fluorine-containing polymer according to claim 1, wherein $Q^1$ and $Q^2$ are a group of the formula:

$$-(CH_2)_m-O\overset{O}{\overset{\|}{C}}R^5\overset{O}{\overset{\|}{C}}O-(CH_2)_m- \quad (IV)$$

wherein $R^5$ is a $C_3$–$C_{120}$ alkylene group optionally having an oxy group or a $C_6$–$C_{15}$ aromatic group, and m is an integer of 1 to 8.

4. A fluorine-containing organic polymer according to claim 1, wherein $Q_1$ and $Q_2$ are each a $C_3$–$C_{120}$ alkylene group.

5. A fluorine-containing organic polymer according to claim 3, wherein $R^5$ is a $C_3$–$C_{120}$ alkylene group.

6. A fluorine-containing organic polymer according to claim 3, wherein $R^5$ is a $C_6$–$C_{15}$ aromatic group.

7. A fluorine-containing organic polymer according to claim 3, wherein $R^5$ is a $C_3$–$C_{120}$ alkylene group having an oxy group.

8. A fluorine-containing organic polymer according to claim 1, wherein $Q_1$ and $Q_2$ are each a $C_3$–$C_{120}$ alkylene group having a hydroxy group.

* * * * *